Figure 2:
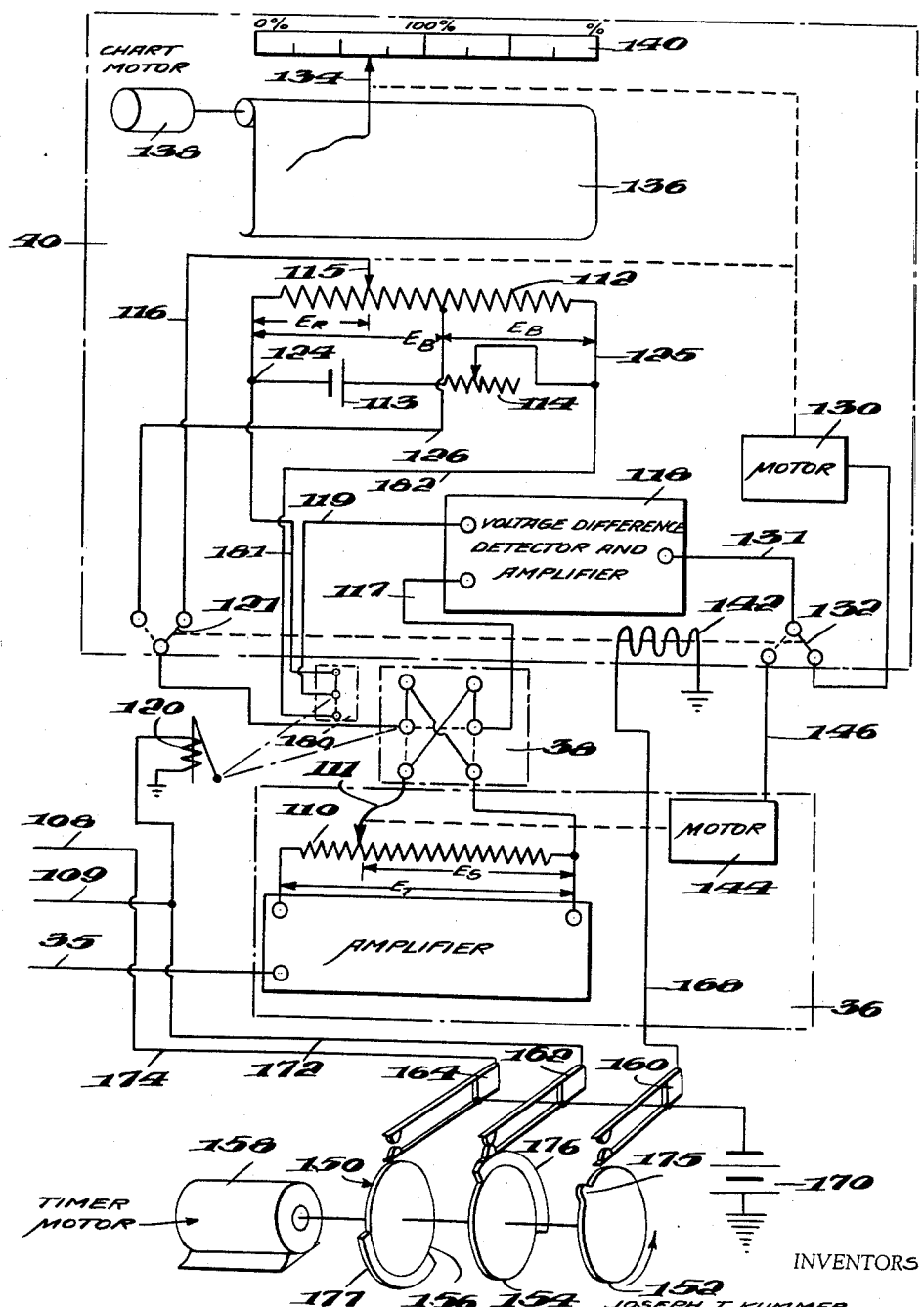

April 12, 1960 J. T. KUMMER ET AL 2,932,739
CONTINUOUS AUTOMATIC MULTIPLE SAMPLE ANALYZER
Filed Jan. 28, 1954 2 Sheets-Sheet 1

INVENTORS
JOSEPH T. KUMMER,
LEONARD J. KRESSLEY,
HAROLD H. GROSSMAN,
PHILIP P. NORTH,
BY
ATTORNEY

April 12, 1960  J. T. KUMMER ET AL  2,932,739
CONTINUOUS AUTOMATIC MULTIPLE SAMPLE ANALYZER
Filed Jan. 28, 1954  2 Sheets-Sheet 2

INVENTORS
JOSEPH T. KUMMER,
LEONARD J. KRESSLEY,
HAROLD H. GROSSMAN,
PHILIP P. NORTH,
BY
ATTORNEY

United States Patent Office 2,932,739
Patented Apr. 12, 1960

2,932,739
CONTINUOUS AUTOMATIC MULTIPLE SAMPLE ANALYZER

Joseph T. Kummer, Midland, Leonard J. Kressley, Saginaw, and Harold H. Grossman and Philip P. North, Midland, Mich., assignors to The Dow Chemical Company, Midland, Mich., a corporation of Delaware Application January 28, 1954, Serial No. 406,862

10 Claims. (Cl. 250—43.5)

This invention relates to an improved continuously operating system for analyzing a plurality of flowing mixtures, and more particularly relates to the analysis by improved absorption spectrophotometric apparatus of specimen mixtures existing in different process flow streams or in different parts of the same plant process flow stream. The invention further relates to improved absorption spectrophotometers utilized in such systems which are provided with a plurality of radiation transparent compartments located in co-axial alignment with respect to each other and along the axis of an electromagnetic beam, and through which the beam rays pass in successive order.

The invention is more particularly concerned with a novel automatic system embodying an improved ultraviolet recording spectrophotometer for measuring the butadiene concentration in a stream of light hydrocarbon gases comprised predominantly of hydrogen and methane as the fluid stream enters and leaves a butadiene absorber. The measurements obtained provide a continuous and current check on the condition of the butadiene absorbing medium in the absorber and indicate possible breakthrough of butadiene into the hypersorber to which the gas stream flows after it leaves the absorber. As will become apparent from the detailed description of the improved spectrophotometer analyzing system which follows, it may be utilized in a large number of other applications, such as in the control of plant process reactions wherein the mixtures to be analyzed are produced or consumed, in controlling the mixing or blending of substances to be analyzed with one another or with other material to form blended products or in controlling other types of separation procedures such as fractionation, extraction and the like.

Heretofore, systems employing absorption spectrophotometric means have been known for analyzing a plant process flow stream mixture to obtain the proportion of one constituent or component therein, or to obtain the proportions of the constituents in a known two component mixture by obtaining and subtracting the proportion of one constituent from the whole. In the use of such systems, the characteristic absorption spectrum of a component or constituent of the specimen to be analyzed is determined and, by use of a monochromator, a band of radiation is selected from the radiation source which includes the wave length portion of the spectrum absorbed by the component of the specimen. Thus the electromagnetic radiation utilized may fall within the limits of the infrared, ultraviolet or X-ray spectrums and the wave length range of the spectrum employed is determined by the absorption characteristics of the specimen constituent under investigation. The amount or intensity of radiation absorption by the constituent or component contained in the specimen is then ascertained by the use of an appropriate radiation detector from which data the actual proportion of the component in the specimen may be calculated. Such systems have heretofore embodied absorption spectrophotometers utilizing a single cell or compartment through which the specimen stream mixture flowed. Since the apparatus could accommodate but a single specimen stream, it has not been practical to utilize the prior art systems for the measurement of selected component concentrations either in a plurality of different streams or at different locations in the same plant process stream.

When it is desired continuously to analyze, with prior art systems and instrumentalities, a plurality of specimen mixtures to obtain the proportions of a selected constituent therein, it is necessary to employ several of the said single compartment or cell instruments and to correlate the resulting data from the various instruments. In practice, accurate analyses by such data correlation were laborious and difficult to achieve due to many variable factors peculiar to and inherent in the individual spectrophotometers. While corrections for these variable factors can be achieved in individual instruments by employing such expediencies as split beam systems, including balanced output networks, special compensator cells, filters, and the like, it is difficult and time consuming to ascertain and apply corrective factors for each of several instruments in order to obtain data which can be equated and used for comparative analyses.

It is therefore an object of this invention to provide a novel analyzing system utilizing improved absorption spectrophotometric means which will accommodate the flow of a plurality of individual specimen containing mixtures in separate radiation transparent compartments which are co-axially positioned within the rays of a single beam of electromagnetic radiation that successively pass through said compartments.

Another object of this invention is to provide an improved absorption spectrophotometric apparatus for use in the aforesaid novel analyzing system wherein the plurality of separate radiation transparent specimen compartments are co-axially positioned with the rays of a beam of electromagnetic radiation intermediate a single source thereof and a single radiation intensity detecting device.

Another object of this invention is to provide an improved automatic absorption spectrophotometric analyzing system provided with a plurality of co-axially aligned radiation transparent compartments and distribution means for effecting the continuous flow of standardizing fluid through all said compartments except a selected one thereof through which continuously flows a specimen mixture to be analyzed selected from one of a plurality of sources.

Another object of this invention is to provide an improved automatic absorption spectrophotometric analyzing system provided with a plurality of co-axially aligned fluid compartments for successively analyzing the concentration of a component in continuously flowing specimen mixtures which are obtained from different points in a process flow stream and singly passed through separate compartments while the remaining compartments are filled with flowing standardizing fluid.

Another object of the invention is to provide an improved automatic absorption spectrophotometric analyzing system for continuously determining the amount of a constituent in one of a plurality of different constituent-containing specimen mixtures which comprises means for successively flowing a different specimen mixture through one of a plurality of co-axially positioned compartments located on the axis of an electromagnetic beam and means for continuously flowing a standardizing fluid through all compartments except the one through which the specimen mixture flows.

Another object is to provide an improved automatic absorption spectrophotometric analyzing and recording system wherein a different specimen mixture is successively flowed through a different one of a plurality of co-axially positioned radiation transparent compartments and the analyzer response for each different specimen mixture is recorded by an individual presentation or trace on a single record chart.

A further object of the invention is to provide an improved automatic ultraviolet absorption spectrophotometric analyzing and recording system wherein a butadiene containing specimen from a first source is continuously flowed through the first of two co-axially positioned compartments in the ultraviolet beam while standardizing gas is passed through the second compartment and subsequently thereto butadiene containing specimen from a second source is continuously flowed through the second compartment while standardizing fluid is continuously flowed through the first compartment.

A still further object of the invention is to provide improved means for recording the outputs of the analyzing system relative to each of the butadiene containing specimen mixtures upon separate sides of a chart calibrated at mid-scale to indicate 100% light transmission, i.e. 0% butadiene content, and 0% light transmission at each of the opposite sides thereof.

A still further object of the invention is to provide improved programming means utilized in the analyzing system by which the above described flow paths are established in sequential order and the recording mechanism conditioned to provide continuous records of the component concentration of the different component-containing specimens.

Further objects and advantages of the present invention will become apparent to those skilled in the art from the accompanying description and disclosure of the construction and arrangements shown by way of illustration in the accompanying drawings, in which:

Figure 1 shows a diagrammatical arrangement of apparatus including an absorption spectrophotometric device comprising a system for analyzing specimen mixtures from a plurality of locations in a plant process stream, and Figure 2 is a schematic representation in greater detail of programming, amplifying and recording apparatus forming a part of the analyzing system shown in Figure 1.

While the invention is susceptible of various modifications and alternative constructions, there is shown in the drawings and will be herein described in detail the preferred embodiment, but it is to be understood that it is not thereby intended to limit the invention to the form disclosed, but it is intended to cover all modifications and alternative constructions falling within the spirit and scope of the invention as expressed in the appended claims.

Referring to Figure 1, numeral 10 indicates a pipe line in which flows under pressure a gas mixture containing 1,3-butadiene. The butadiene is mixed with light hydrocarbon gases which principally comprise hydrogen and methane. Since butadiene polymerizes on the activated charcoal during stripping operations carried on within the hypersorber 12 located in line 10 and cuts down the activity of the charcoal therein, it is desired to eliminate as much as possible and preferably all of the butadiene from the light hydrocarbon gases flowing in line 10 prior to its entry into the hypersorber. For this purpose, butadiene absorber 14 is positioned in line 10 forwardly of the hypersorber 12 in order that butadiene containing gas will flow therethrough prior to entering the hypersorber.

Electromagnetic absorption spectrophotometric apparatus capable of measuring the butadiene content of the gas flow at two different locations in pipe line 10 is represented by the apparatus enclosed in bracket A located in the lower portion of Figure 1. In brief, this apparatus comprises an ultraviolet spectrophotometer, identified generally by reference numeral 15 which is provided with a plurality of ultraviolet transparent compartments 16 and 18 that are co-axially positioned with respect to one another and to the axis of the ultraviolet beam 20 emanating from ultraviolet source 22 and directed toward the energy detecting device 24. As previously stated, the spectrophotometer and its various component parts need not be limited to ultraviolet generating or responsive types, but may include those generating or effected by other types of radiations of wave lengths of other ranges in the spectrum. This is applicable to all subsequent references to ultraviolet responsive, transparent, or source members, as the ultraviolet type equipment is merely illustrative of this aspect of the invention.

A system of distribution for continuously introducing specimen gas mixtures from a plurality of points in the flow stream of pipe 10 into the ultra-violet transparent compartments 16 and 18 is represented by the portion of Figure 1 enclosed in bracket B. In addition, this portion of the analyzing system serves to effect scavenging of the specimen gas from the respective compartments and to distribute to compartments 16 and 18 a standardizing medium, i.e. butadiene-free gas which may conveniently consist of the aforementioned light hydrocarbon gases after the butadiene content has been removed therefrom.

The ultraviolet spectrophotometer 15 is provided with a Nester hydrogen discharge lamp which serves as a source 22 of ultraviolet radiation, a beam of which is represented by reference numeral 20. The power for energizing the hydrogen discharge lamp is furnished by an electronically stabilized power supply 26 of the general type described by Coor and Smith in Rev. Sci. Instru. 18, 173 (1947). The ultraviolet beam 20 enters a monochromator 28 which is adjusted in accordance with the desired wave length of energy to be used during analysis of the specimens. To measure the butadiene content in the flow stream of line 10, the monochromator 28 is preferably adjusted to 216 mu at which wave length butadiene has a characteristic absorption band. Further, from experimental test results it has been determined that at this wave length the remaining gas mixture constituents, i.e. hydrogen and methane in line 10, do not absorb radiation, and, consequently, all interference resulting from the carrier gas is eliminated from the analytical results. The energy in beam 20 emitted from the monochromator 28 is directed into a quartz window 30 of compartment or cell 16. Radiation which is not absorbed by the contents of compartment 16 passes from compartment 16 through quartz window 32 and into compartment 18. Compartments 16 and 18 are positioned in axial alignment along the axis of beam 20. By this arrangement the rays of the ultraviolet beam 20 will pass through the compartments in succession, i.e. through quartz window 30, compartment 16, quartz window 32, compartment 18, and will exit from compartment 18 through quartz window 34. The ultraviolet rays of beam 20 upon leaving compartment 18 impinge upon an intensity detecting device 24 which comprises a photocell that is sensitive to the radiation falling thereon. The output of photocell 24 is amplified to a recording level by amplifier 36. After amplification the output signal of the radiation detecting device 24 is connected to a polarity controlling device 38 and then to recording mechanism indicated generally by reference numeral 40.

Monochromator 28, photocell detecting device 24 and amplifier 36 comprise parts of a Beckman Model DUR recording ultraviolet spectrophotometer manufactured by Beckman Instruments, Inc. of Alhambra, California, and since their features are well known, detailed description is unnecessary.

Compartments or cells 16 and 18 which are fluid-tight may be formed in axial alignment in a single cell housing 42 and utilize a common quartz window therebetween, such as 32, or the compartments may each be provided with a separate housing and have individual radiation transparent windows located at opposite ends of the respective housings. In this latter form, the housings may be co-axially located in window-to-window engagement or the separate compartments may be spaced a distance apart along the axis of the ultraviolet beam. It will be apparent that an additional number of compartments may be utilized and positioned in coaxial relation to each other along the axis of the radiation beam to accommodate additional specimen fluid mixtures without departing from the scope of this invention. It is contemplated that the number of co-axially arranged compartments will equal the number of specimen mixtures to be analyzed, and, accordingly, if it is desired to analyze the specimen mixtures for more than two points in the flow stream of the plant a corresponding greater number of compartments will be utilized. Each of the compartments or cells 16 and 18 is provided with openings which serve as ingress and egress means for gas streams as will hereinafter be more fully described. Compartment 16 is provided with openings 44 and 46 which extend between the interior and exterior of the housing and pass through housing 42. Compartment 18 is provided with openings 54 and 56 which extend in a similar manner between the interior and exterior thereof and pass through housing 42.

The distribution system included in brackets B of Figure 1 serves (1) to charge compartments 16 and 18 with butadiene-free standardizing gas during the period that the recording mechanism 40 is automatically calibrating itself to a selected scale value, and (2) to maintain the flow of standardizing gas in one of the compartments (or more than one if additional compartments are utilized) while the other compartment is charged with the butadiene-containing specimen mixture to be analyzed. As previously explained, a butadiene-containing mixture flows in the flow stream of line 10 through the butadiene absorber 14 wherein the butadiene content of the mixture is reduced. The light hydrocarbon gases comprising principally hydrogen and methane continue to flow in line 10 to hypersorber 12 where any remaining butadiene is removed by contact with the activated charcoal therein. The butadiene-free light hydrocarbon gases flow from the hypersorber 12 in pipe line 11 for delivery to a part of a manufacturing process which forms no part of the present invention.

Standardizing gas for the ultraviolet spectrophotometric apparatus is preferably removed from pipe 11 through line 48 which is teed into pipe 11 at point 50. A filter, indicated by reference numeral 52, and an adjustable pressure regulator 58 are located in line 48. After the standardizing gas flows through pressure regulator 58 it is divided into two streams which flow in branches 60 and 62. Branch 60 comprises pipe line 64 which terminates in opening 44 of compartment 16 and includes an adjustable needle valve 66 and rotameter 68. Branch 62 contains pipe line 70 which terminates in opening 54 of compartment 18 and includes needle valve 72 and rotameter 74. Opening 46 of compartment 16 is connected to line 76 which branches at 78 into lines 80 and 82. Pipe line 80 contains relief valve 84, the outlet of which is connected to vent pipe 86 which is open to atmosphere. Branch line 82 has interposed therein a filter 88, an adjustable pressure regulator 90, needle valve 92 and rotameter 94. Branch line 82 is teed at location 96 to pipe line 10 on the outlet side of butadiene absorber 14 and inlet side of hypersorber 12.

In a similar manner opening 56 of compartment 18 is connected to pipe line 77 which branches at 79 into lines 81 and 83. Pipe line 81 contains relief valve 85, the outlet of which is connected to vent pipe 86 which is open to atmosphere. Branch line 83 has interposed therein a filter 89, an adjustable pressure regulator 91, needle valve 93 and rotameter 95. Branch line 83 is teed at location 97 to pipe line 10 on the inlet side of butadiene absorber 14. Relief valves 84 and 85, which are biased to closed position, are opened against the bias by the pressure in lines 80 and 81 as will be hereinafter described.

Lines 98 and 99 are respectively connected to lines 64 and 70 by T's 100 and 102. An electromagnetically actuated valve 103 is positioned in pipe line 98 and the outlet thereof is connected via pipe 104 to line 86 and is thus vented to the atmosphere. In a similar manner electromagnetically actuated valve 105 is connected in line 99 and the outlet of the valve is connected to pipe 104, which in turn is connected to atmospheric vent pipe 86. Electromagnetically actuated valves 103 and 105 are biased to closed position when their respective operating coils 106 and 107 are deenergized. Upon energizing coil 106 by applying potential to lead 108 and ground, the armature is actuated to remove the valve from its valve seat, thus permitting gas to flow through the valve to atmosphere. In a similar manner, upon energizing coil 107 of electromagnetic valve 105 by applying a potential to lead 109 and ground, the armature is actuated to remove the valve from its seat, thus permitting passage of fluid through valve 105 to atmosphere.

The output of the photocell 24 is conducted by conductor 35 to an amplifier 36 and the voltage output $E_T$ of the amplifier is impressed across a potentiometer 110. The voltage $E_S$ existing between one side of the potentiometer and sliding contact 111 is impressed upon the balancing circuit of the recording device 40 and the polarity changing device 38 which is positioned between the balancing circuit and the amplifier. The polarity changing device 38 comprises a reversing switch electromagnetically actuated by solenoid 120 which is mechanically connected to the movable blades of the reversing switch. The balancing circuit of the recording device comprises a slide wire 112 which is connected in parallel relation with a serially connected potential source 113 in the form of a cell and a variable resistance 114. The voltage existing across half of the slide wire 112 is indicated by $E_B$ and may be manually adjusted by the variable resistance 114. The $E_S$ voltage is applied across the balancing circuit by circuitry wherein one side of the $E_S$ potential is connected to the slider 115 of slide wire 112 through conductor 116 and contactor 121 and the opposite side of the potential $E_S$ is connected to a voltage difference detector and amplifier 118 by lead 117 from the reversing switch 38. The other terminal of the voltage difference detector and amplifier 118 is connected via conductors 119, 181 and 182 through selector switch 180 (operated simultaneously with polarity reversing switch 38) to either side 124 or side 125 of slide wire 112. The center of the slide wire 112 is connected by conductor 126 to contactor 121. The output of voltage difference detector and amplifier 118 energizes a reversible motor 130 through conductor 131 and contactor 132 to move the slider 115 and to simultaneously therewith move the recording stylus equipped index 134 with respect to chart 136 which is moved by chart motor 138. The recording stylus equipped index 134 is associated with an index scale 140 which is marked to indicate a 100% full scale deflection at the center of the chart with zero scale deflections at the opposite sides of the chart. The voltage difference detector and amplifier 118 is of known structure and is manufactured by The Brown Instrument Company, Philadelphia, Pennsylvania, for which reason the details thereof which form no part of this invention have been omitted from this description.

Contactors 121 and 132 which are biased to the contacting position shown in Fig. 2 are electromagnetically actuated by energizing coil 142 to shift the respective contactor blades to (1) connect the center of slide wire 112 by conductor 126 to one side of the voltage $E_S$ existing across the selected portion of potentiometer 110 and (2) connect the output of voltage difference detector and amplifier 118 to reversible motor 144 via conductor 131, contactor 132 and conductor 146. Reversible motor 144 is mechanically connected to move sliding contact 111 of potentiometer 110 and thus serves to change the value of amplifier output voltage $E_S$ in accordance with the voltage $E_B$ which corresponds to 100% deflection of the recording device.

The automatic multiple sample analyzing device is controlled by a programming mechanism, generally indicated by reference numeral 150 in Figure 2 of the drawings. The programming mechanism comprises a sequentially operating switching mechanism in the form of rotatably mounted cam discs 152, 154 and 156 which are mounted upon a shaft and driven by timer motor 158. The contacts of switches 160, 162 and 164 are actuated respectively by the cam elements 175, 176 and 177 of rotatable discs 152, 154 and 156 when the timer motor 158 is energized. As shown in Figure 2, the cam actuating discs 152, 154 and 156 rotate in a counterclockwise direction and the respective cam elements 175, 176 and 177 of the discs are angularly spaced, so that the contacts of only one of the switches 160, 162 and 164 are closed at any one time. Closure of the contacts of switches 160, 162 and 164 in sequential order serves to impress the potential of battery 170 from ground across and thus energize (1) coil 142 of electromagnetically actuated contactors 121 and 132 via conductor 168 (2) coil 120 of electromagnetic reversing switch 38 and selector switch 180 via conductor 172 and coil 107 of electromagnetically actuated valve 105 via conductors 172 and 109, and (3) coil 106 of electromagnetically actuated valve 103 via conductors 174 and 108. It will be understood that suitable sources (not shown) of energy are connected to electromagnetically controlled power source 26 of ultraviolet source 22, chart motor 138, timer motor 158 and components of the amplifying and recording apparatus.

The flow of standardizing gas and the flow of specimen fluid mixtures to be analyzed from locations 97 and 96 of the plant process stream flowing in pipe 10 through compartments 16 and 18 of the ultraviolet spectrophotometric apparatus are established by adjusting the pressure regulators and needle valves in the respective pipe lines 48, 82 and 83. Pressure regulator 58 and needle valves 66 and 72 are adjusted to give a continuous flow as indicated by rotameters 68 and 74 of standardizing gas through pipes 64 and 70 which terminate in opening 44 of compartment 16 and opening 54 of compartment 70. The standardizing gas after filling compartments 16 and 18 flows therefrom through pipes 76, 80 and 77, 81 to relieve valves 84 and 85. The flow through these relief valves is vented to atmosphere through pipe 86. As previously described, the standardizing gas supplied to compartments 16 and 18 is preferably butadiene-free gas bled from pipe 11 at location 50 on the output side of the hypersorber 12. This source of standardizing gas is desirable due to its availability and also the fact that the gas does not absorb in the wave length vicinity at which the butadiene gas absorbs the ultraviolet radiation. Other sources of standardizing gases with similar absorption characteristics at the wave length used could be employed in place of the gas bled from line 11.

The flow of butadiene specimen mixtures to compartments 16 and 18, which mixtures are automatically analyzed, takes place through lines 82, 76 and 83, 77. The supply pressure and gas flow through lines 82 and 83 are adjusted by the setting of pressure regulators 90 and 91 and needle valves 92 and 93 so that continuous approximately equal flows occur as indicated by rotameters 94 and 95. When standardizing gas is entering each of the separate compartments 16 and 18 in the aforedescribed manner, the butadiene specimen mixture flow in pipe 82 will pass through line 80 to atmosphere via relief valve 84, and the specimen mixture flow in pipe 83 will flow in pipe 81 to atmosphere through relief valve 85. With the system operating in this condition, both compartments 16 and 18 will be concurrently filled with continuously flowing standardizing gas which, after leaving the compartments, is vented to atmosphere through relief valves 84 and 85 together with the butadiene containing specimen mixture continuously flowing in pipes 83 and 82.

When it is desired to analyze the butadiene content in the flow stream existing at location 97 of line 10, valve 105 is opened by energizing coil 107 which (1) permits the standardizing gas flowing in pipe 70 to be vented to atmosphere via pipes 99, 104 and 86, (2) effects a drop in pressure in pipes 77 and 81 which causes relief valve 85 to close, and (3) as a result, the butadiene-containing specimen mixture flowing in pipe 83 is directed through opening 56 into compartment 18 from which it flows via lines 70 and 99 to the atmosphere through the open venting valve 105. The flows are adjusted by the aforesaid means so that the pressure drop of both flows, i.e. the standardizing gas and the butadiene containing specimen mixture through electromagnetically actuated valve 105 and the pressure drop of the butadiene-containing specimen mixture flow through compartment 18 is not sufficient to open relief valve 85. These flows are, however, maintained at sufficiently high values to provide compartment flushing times each way of the order of a minute or less. In this condition of system operation, compartment 16 is filled with continuously flowing standardizing gas and compartment 18 is filled with continuously flowing butadiene-containing specimen mixture from location 97 of line 10. In a corresponding manner, a continuous flow of butadiene-containing specimen mixture from location 96 in line 10 flows via pipes 82, 76 through opening 46 into compartment 16 when electromagnetically actuated valve 105 is closed and valve 103 is opened to vent to atmosphere the standardizing gas flowing in pipe 64 and to reduce the pressure on relief valve 84 so that it closes and terminates flow through pipe 80. The specimen gas continuously flows from compartment 16 through opening 44, pipes 64 and 98 to atmosphere via pipes 104 and 86. Thus, in this condition of operation, compartment 16 is filled with a continuously flowing specimen mixture from point 96 of the flow steam in line 10 and compartment 18 is filled with continuously flowing standardizing gas. It will be understood that electromagnetically actuated valves 103 and 105 are alternately opened to shift the flows of the standardizing gas and the butadiene containing specimen mixture in the aforesaid manner.

The three above described flow plans of the distribution system shown in Figure 1 are summarized as follows: (1) Each of compartments 16 and 18 is filled with continuously flowing standardizing gas, (2) Compartment 18 is filled with continuously flowing butadiene containing specimen mixture from location 97 of the flow stream in line 10 and compartment 16 is filled with continuously flowing standardizing gas, and (3) Compartment 16 is filled with a continuously flowing specimen mixture from location 96 of the flow stream in line 10 and compartment 18 is filled with continuously flowing standardizing gas.

Programming means effecting the above enumerated flow plans in the distribution system in successive order and for compensating the recording means and also shifting the record position on the chart of the recorder commensurate with the specimen mixture under analysis is best shown in Figure 2. When the operating coils 106 and 107 of electromagnetically actuated valves 103 and 105 are both deenergized by being open circuited at switches 164 and 162, standardizing gas continuously flows through compartments 16 and 18 in the aforedescribed manner. Since the butadiene-free standardizing gas is substantially non-absorptive of ultraviolet radiation at the wave length the butadiene absorbs, it is desired to compensate the analyzing instrument and to adjust for 100% deflection at mid-scale when both cells are filled with standardizing gas.

To facilitate description of the operating cycle provided by the timing means, it will be assumed that the programming cycle begins with the compensation of the instrument which is initiated by the closure of switch 160 by movement of cam 175 which is mounted on disc 152. The closing of switch 160 places battery 170 across relay coil 142, causing contactors 121 and 132 to be moved from the full line position against their normal bias to the dotted line position shown in Figure 2, which serves to connect the $E_S$ voltage output of potentiometer 110 to the mid-point of a slide wire 112. Simultaneously therewith, the output lead 131 of voltage difference detector and amplifier 118 is connected to reversible motor 144 via conductor 146. The motor is actuated to operate in a direction to move sliding contact 111 to a point where voltage $E_S$ is equal to the voltage represented by $E_B$ which exists across each half of slide wire 112. Thus, compensation is effected which automatically corrects fluctuation of lamp output, accumulation of dirt on compartment windows or other optical parts, change in photocell response, amplifier drift and aging of the cell employed in the potentiometer circuit. The voltage represented by $E_B$ can be manually varied to maintain $E_B$ smaller than $E_T$ by adjustment of the variable resistance 114. The recording instrument of Figure 2 is calibrated with the 100% scale deflection position located at mid-scale of the chart 136 and 0% deflection positions are located at opposite sides of the chart. By shifting the polarity of the voltage being applied to the recorder, the recorded values of butadiene concentration existing in the flow stream at location 97 can be recorded on one side of the chart and the value of any butadiene concentration existing in the flow stream at location 96 of line 10 can be recorded on the other side of the chart. The final record made by the recording stylus equipped index 134 on chart 136 will consist of indications to each side of mid-scale, one side for each specimen stream being analyzed, the peaks of which form a continuous curve of time vs. butadiene concentration in the process.

As the timer motor 158 continues rotation, cam element 176 of disc 154 closes switch 162 which places the battery across coil 107 and thereby actuates valve 105 to open position and also places the battery across coil 120 to operate selector switch 180 and reversing switch 38 to pole the amplifier voltage so that the record will be made on a selected side of the chart. As previously described, the opening of valve 105 causes compartment 18 to be filled with continuously flowing butadiene containing specimen mixture from point 97 of the flow stream 10 and compartment 16 to remain filled with continuously flowing standardizing gas. Since a portion of the radiation will be absorbed by the butadiene contained in fluid in cell 18, the recording stylus equipped index 134 will be moved away from mid-scale position to indicate the content of butadiene existing in the flow stream. The movement of stylus 134, together with slide 115 is controlled by the reversible motor 130 which is energized by the output of voltage difference detector and amplifier 118 in order to maintain the voltage represented by $E_R$ equal to the voltage $E_S$ of the photocell amplifier 36. Further rotation of timer motor 158 will result in the opening of switch 162 and closure of switch 164 by cam element 177 on disc 156. The cam surfaces are positioned to provide an interval of time between the opening of 162 and closure of switch 164, in which interval standardizing gas flows through compartment 18 to effect scavenging of the specimen mixture therefrom. Upon opening switch 162, the reversing switch returns to the position indicated by solid lines in Figure 2 of the drawing. Closure of switch 164 places the battery across operating coil 106 to actuate valve 103 to open position. The record will thereby be made on the opposite side of the chart. With switch 164 closed, compartment 16 is filled with continuously flowing specimen fluid from location 96 of the flow stream 10, and compartment 18 is filled with continuously flowing standardizing gas. The output of photocell 24 after amplification will thus be recorded by recording stylus equipped index 134 on the opposite side of the chart by motor 130 operating in accordance with the output of the voltage difference detector and amplifier 118. At the completion of the analysis of the specimen mixture flowing in compartment 16, the aforedescribed cycle is repeated in order that a continuous record may be obtained of the butadiene concentration in the plant process flow stream.

We claim:

1. An absorption spectrophotometric analyzing system for continuously determining the amount of a constituent in one of a plurality of different specimen mixtures which may contain said constituent and at least one of which specimen mixture does contain said constituent, comprising in combination: a plurality of sources of said specimen mixtures, a source of constituent-free fluid, a source of radiations in the range between infrared and X-ray radiations, a detecting device sensitive to the energy of radiation positioned in the range of rays of said radiation, monochromator means positioned in the range of rays between said source of radiation and said detecting device to provide a desired narrow band width of radiation, a plurality of radiation transparent compartments located intermediate said monocromator means and said detecting device through which compartments radiation rays pass in succession, means for charging a radiation compartment with a continuously flowing specimen mixture from one of said plural sources and for concurrently charging the remaining compartments with a constituent-free fluid from said source, and means for thereafter removing said specimen mixture from said compartment by scavenging said compartment with a constituent-free fluid.

2. An absorption spectrophotometric analyzing system for continuously determining the amount of a constituent in one of a plurality of different specimen mixtures which may contain said constituent and at least one of which specimen mixtures does contain said constituent, comprising in combination: individual sources for each of said specimen mixtures, a source of constituent-free fluid, a source of radiations in the range between infrared and X-ray radiations, a detecting device sensitive to the energy of radiation positioned in the range of rays of said radiation, monochromator means positioned in the range of rays between said source of radiation and said detecting device to provide a desired narrow band width of radiation, a plurality of radiation transparent compartments located intermediate said monochromator means and said detecting device through which compartments radiation rays pass in succession, means for charging a radiation compartment with a continuously flowing specimen mixture from one of said sources and concurrently charging the remaining compartments with a continuously flowing constituent-free fluid from said source, and means for thereafter charging a different radiation compartment with a continuously flowing specimen from a different one of said individual sources and concurrently charging the remaining compartments with a continuously flowing constituent-free fluid from said source.

3. An absorption spectrophotometric analyzing system for continuously determining the amount of a constituent in one of a plurality of different specimen mixtures which may contain said constituent and at least one of which specimen mixtures does contain said constituent, comprising in combination: a plurality of sources of said different specimen mixtures, a source of constituent-free fluid, a source of radiations in the range between infrared and X-ray radiations, a detecting device sensitive to the energy of radiation positioned in the range of rays of said radiation, monochromator means positioned in the range of rays between said source of radiation and said detecting device to provide a desired narrow band width of radiation, a plurality of co-axially positioned radiation transparent compartments located intermediate said monocromator means and said detecting device through which compartments radiation from said source passes in successive order, a first means for effecting the continuous flow of constituent-free fluid through all of said compartments, a second means for effecting the continuous flow of a different specimen mixture through each of said compartments, means cooperating with said first and second means to prevent the continuous flow of constituent-free fluid in a compartment when said different specimen mixture is flowing therein, and timer means controlling the operation of said latter means to permit the successive flow of said different specimen mixture through each of said co-axially positioned compartments.

4. An absorption spectrophotometric analyzing system for continuously determining the amount of a constituent in one of a plurality of different specimen mixtures, comprising in combination: a plurality of sources of said specimen mixtures, a source of constituent-free fluid, a source of electromagnetic radiations selected from the group consisting of infrared, ultraviolet, and X-ray radiations, a detecting device sensitive to the energy of radiation positioned in the range of rays of said electromagnetic radiation, monochromator means positioned in the range of rays between said source of radiation and said detecting device to provide a selected narrow band width of radiation, a plurality of co-axially positioned radiation transparent compartments located intermediate said monochromator means and said detecting device through which compartments radiation rays pass in successive order, means for successively charging a different radiation compartment with a continuously flowing speciment mixture from a different one of said plurality of sources and concurrently charging the remaining compartments with a continuously flowing constituent-free fluid from said source, and recording means responsive to the outputs of said detecting device for recording the amount of the constituent in each of said specimens successively charged into said compartments.

5. An analyzing system for continuously determining the proportion of a constituent in one of a plurality of different specimen fluid mixtures, comprising in combination, a plurality of specimen fluids to be analyzed, a source of said specimen fluid free of said constituent, a source of electromagnetic radiations selected from the group consisting of infrared, ultraviolet, and X-ray radiations, a detecting device sensitive to the energy of radiation positioned in the range of rays of said electromagnetic radiation, monochromator means positioned in the range of rays between said source of radiation and said detecting device to provide a selected narrow band width of radiation, a plurality of radiation transparent compartments located intermediate said monochromator means and said detecting device through which radiation rays pass in succession, means for charging a radiation transparent compartment with a continuously flowing specimen fluid and concurrently charging the remaining compartments with a continuously flowing constituent-free specimen, means for thereafter charging a different radiation transparent compartment with a continuously flowing different specimen fluid and concurrently charging the remaining compartments with a continuously flowing constituent-free specimen from said source, and recording mechanism energized by the output of the detecting device for recording the proportions of said constituent in each of said specimen fluids.

6. An absorption spectrophotometric analyzing system for continuously determining the amount of a constituent in each of two different specimen mixtures at least one of which contains said constituent, comprising in combination: two sources of said specimen mixtures, a source of constituent-free fluid, a source of ultraviolet radiation, a detecting device sensitive to the ultraviolet radiation positioned in the range of rays of said radiation, monochromator means positioned in the range of rays between said source of ultraviolet radiation and said detecting device to provide a selected narrow band width of radiation, two co-axially positioned ultraviolet transparent compartments located intermediate said monochromator means and said detecting device through which compartments ultraviolet radiation rays pass in successive order, and means for alternately charging said radiation compartments with a continuously flowing specimen mixture from each of said sources and concurrently charging the other compartment with a continuously flowing constituent-free fluid from said source.

7. An absorption spectrophotometric analyzing system for continuously determining the amount of a constituent in each of two different specimen mixtures at least one of which contains said constituent, comprising in combination: two sources of said specimen mixtures, a source of constituent-free fluid, a source of ultraviolet radiation, a detecting device sensitive to the ultraviolet radiation positioned in the range of rays of said radiation, monochromator means positioned in the range of rays between said source of ultraviolet radiation and said detecting device to provide a selected narrow band width of radiation, two co-axially positioned ultraviolet transparent compartments located intermediate said monochromator means and said detecting device through which compartments ultraviolet radiation rays pass in successive order, means for alternately charging said radiation compartments with a continuously flowing specimen mixture from each of said sources and concurrently therewith charging the other compartment with a continuously flowing constituent-free fluid from said source, and timer means for automatically effecting the aforesaid charging operations.

8. An absorption spectrophotometric analyzing system for continuously determining the amount of a constituent in each of two different specimen mixtures at least one of which contains said constituent, comprising in combination: two sources of said specimen mixtures, a source of constituent-free fluid, a source of ultraviolet radiation, a detecting device sensitive to the ultraviolet radiation positioned in the range of rays of said radiation, monochromator means positioned in the range of rays between said source of ultraviolet radiation and said detecting device to provide a selected narrow band width of radiation, two co-axially positioned ultraviolet transparent compartments located intermediate said monochromator means and said detecting device through which compartments ultraviolet radiation rays pass in successive order, means for alternately charging said radiation compartments with a continuously flowing specimen mixture from each of said sources and concurrently therewith charging the other compartment with a continuously flowing constituent-free fluid from said source, a two position trace recording mechanism connected to the output of said detecting device, and timer means for automatically effecting the aforesaid charging operations and for selecting a recording trace in accordance with the specific compartment in which said specimen mixture is flowing.

9. An absorption spectrophotometric analyzing system for continuously determining the amount of butadiene in each of two different specimen mixtures at least one of which contains butadiene, comprising in combination: two sources of said specimen mixtures, a source of butadiene-free fluid, a source of ultraviolet radiation, a detecting device sensitive to the ultraviolet radiation positioned in the range of rays of said radiation, monochromator means positioned in the range of rays between said source of ultraviolet radiation and said detecting device to provide a selected narrow band width of radiation, two co-axially positioned ultraviolet transparent compartments located intermediate said monochromator means and said detecting device through which compartments ultraviolet radiation rays pass in successive order, means for alternately charging said radiation compartments with a continuously flowing specimen mixture from each of said sources and concurrently therewith charging the other compartment with a continuously flowing butadiene-free fluid from said source, a recording mechanism connected to the output of said detecting device provided with a movable chart and calibrated with full deflection at mid-scale and zero deflection at the opposite sides thereof, and timer means for automatically effecting the aforesaid charging operations and for shifting the side of said chart upon which the record is made in accordance with the specific compartment in which the specimen mixture flows.

10. An absorption spectrophotometric analyzing system for repeatedly determining the amount of a constituent in streams of each of two different specimen mixtures at least one of which mixtures contains said constituent, comprising in combination two sources of specimen mixtures, means for supplying flows of said specimen mixtures from said two sources, a source of constituent-free fluid, a source of energy radiations in the range from infrared to X-rays, a detecting device sensitive to the energy of radiation positioned in the path of rays of said radiations, monochromator means positioned in the path of the rays between said source of radiation and said detecting device to provide a desired narrow band width of radiation, a plurality of radiation-transparent compartments also located in said path of rays between said source of radiation and said detecting device, said compartments being arranged relative to each other so that radiation passes therethrough in succession, means for successively charging all of said radiation-transparent compartments with a constituent-free fluid from said source thereof and for then charging one of said radiation-transparent compartments with a specimen from one of said sources thereof while the other of said compartments is charged with the constituent-free fluid and subsequently charging the other of said compartments with a specimen from the other of said specimen sources and for concurrently charging said first specimen charged compartment with constituent-free fluid from said source thereof, and recording means responsive to the outputs of said detecting device for recording the amount of the constituent in each of said specimens successively charged into said compartments.

References Cited in the file of this patent

UNITED STATES PATENTS

| | | |
|---|---|---|
| 2,066,934 | Gulliksen | Jan. 5, 1937 |
| 2,350,001 | Van Den Akker | May 30, 1944 |
| 2,395,489 | Major et al. | Feb. 26, 1946 |
| 2,486,622 | White | Nov. 1, 1949 |
| 2,518,307 | Groebe | Aug. 8, 1950 |
| 2,545,162 | Muly et al. | Mar. 13, 1951 |
| 2,547,212 | Jamison et al. | Apr. 3, 1951 |
| 2,666,854 | Hutchins | Jan. 19, 1954 |
| 2,694,335 | Albright et al. | Nov. 16, 1954 |
| 2,720,594 | Hutchins | Oct. 11, 1955 |
| 2,764,536 | Hutchins | Sept. 25, 1956 |